United States Patent [19]

Hardy

[11] 4,438,330
[45] Mar. 20, 1984

[54] WAVEFRONT SENSOR EMPLOYING A MODULATION RETICLE

[75] Inventor: John W. Hardy, Lexington, Mass.

[73] Assignee: Itek Corporation, Lexington, Mass.

[21] Appl. No.: 353,554

[22] Filed: Mar. 1, 1982

[51] Int. Cl.³ .............................................. G01U 1/20
[52] U.S. Cl. ..................................... 250/201; 250/216
[58] Field of Search .......... 250/201, 204, 216, 237 R, 250/237 G, 578, 203 R; 372/95, 99

[56] References Cited

U.S. PATENT DOCUMENTS

| | | | |
|---|---|---|---|
| 3,586,665 | 6/1971 | Weyrauch | 250/231 |
| 3,832,066 | 8/1974 | Cornsweet | 356/127 |
| 3,923,400 | 12/1975 | Hardy | 356/107 |
| 4,091,274 | 5/1978 | Angelbeck et al. | 250/201 |
| 4,271,355 | 6/1981 | Wisner et al. | 250/201 |
| 4,393,303 | 7/1983 | Spinhirne | 372/95 |

Primary Examiner—David C. Nelms
Attorney, Agent, or Firm—Homer O. Blair; Robert L. Nathans; Gerald H. Glanzman

[57] ABSTRACT

An incremental slope wavefront sensor having an optical system which focuses an incident wavefront to a focal point. A novel modulation reticle is positioned at the focal point, and is driven in linear oscillation along a single axis. The modulation reticle has a modulation pattern formed thereon by alternating triangular light transmissive areas and inverted triangular light reflective areas. A first detector array detects the wavefront which has passed through the transmissive areas and diverged from the focal point in a two dimensional array of zones. A second detector array detects the wavefront which has been reflected by the reflective areas and diverged from the focal point in a two dimensional array of zones. The output signals from the first and second detector arrays for each corresponding zone are differentially combined to form a differential output signal for each zone. The y position of detected radiation in each zone of the wavefront is obtained by multiplying its differential output signal by a weighting function proportional to the instantaneous velocity of the reticle. The x position of detected radiation in each zone is obtained by multiplying its differential output signal by a weighting function proportional to the instantaneous velocity of the reticle and by a square wave function having respectively positive and negative values when the displacement of the reticle along the single axis is respectively positive and negative with respect to a coordinate system defined by the modulation pattern.

11 Claims, 6 Drawing Figures

WAVEFRONT SENSOR EMPLOYING A MODULATION RETICLE

BACKGROUND OF THE INVENTION

1. Field of the Invention

The present invention relates generally to a wavefront sensor for detecting wavefront tilts along two orthogonal directions, and more particularly pertains to a simple, white light wavefront sensor of the aforementioned type which is particularly suitable for a real-time solar image compensation system.

The field of active optics technology can be applied to high performance optical systems which encounter or are subject to random disturbances such as vibration, thermal transients or atmospheric turbulence. Active optics technology can be applied to laser beam control systems and compensated imaging systems. For instance, concerning the latter types of systems, the resolution of ground based optical imaging systems is frequently severely limited by random wavefront tilts and phase changes produced by atmospheric turbulence. The resolution of such optical systems can usually be improved considerably if the atmospheric distortion is measured and corrected in real-time before recording the image on tape or film.

2. Discussion of the Prior Art

Hardy U.S. Pat. No. 3,923,400 discloses a real time wavefront correction system of the type discussed above in which real time phase distortions in a wavefront being imaged by an optical system are detected and substantially eliminated prior to recording of the image. The Hardy wavefront correction system utilizes an AC, lateral shearing interferometer to measure in real time the relative phase differences of the wavefront. The measured phase differences are directed to an analog data processor which generates a plurality of electrical signals proportional to the required corrections at different areas of the wavefront. The electrical signals are applied to a phase corrector upon which the wavefront is incident to change the relative phase at various locations of the wavefront to achieve a wavefront in which the phase distortion is removed. The phase correction device can for instance consist of a mirror having an array of piezoelectric elements which function to selectively deform the mirror to correct phase distortions in the wavefront.

A similar type of active optics system has also been applied to an optical system for solar observations, and employs a rotating radial or Ronchi grating to detect wavefront tilts. In this prior art arrangement an array of photodetectors positioned at the conjugate image of a deformable mirror detect signals modulated by the rotating radial grating. The phase of the electrical signal at each detector is directly related to the wavefront slope at the conjugate image of the deformable mirror, and is utilized to selectively control the mirror surface in a feedback loop to null the errors. A drawback of this system is the use of relatively complex hardware having a mechanically rotating grating to modulate the wavefront prior to detection. A system of this type also requires the location of a precisely adjustable field stop in the image plane at which the rotating grating is positioned, which results in complications of both the optical and mechanical systems. Moreover, a wavefront sensor having a mechanically rotated grating is undesirable in many system applications, such as space systems and equipment requiring a compact size and a substantial tolerance to shocks and vibrations.

SUMMARY OF THE INVENTION

Accordingly, it is a primary object of the present invention to provide an improved incremental slope wavefront sensor having a relatively simple and rugged design.

A further object of the subject invention is the provision of an incremental slope wavefront sensor capable of operation at kilohertz frequencies and above which does not require a mechanically rotating grating. However, the wavefront sensor of the present invention does modulate or chop the light of the wavefront to eliminate errors caused by detector nonlinearity and nonuniformity, thereby resulting in a high performance detection system.

Incremental slope wavefront sensors within the teachings of the present invention have many advantageous characteristics. They can operate in either monochromatic or white light, and also are capable of operation with extended, incoherent sources of radiation. Optical path differences are measured independent of the wavelength of the source, and the performance is independent of the aperture size of the optical system. Finally, a local reference beam is not required, as in many prior art wavefront sensors such as the aforementioned Hardy system.

The disclosed embodiments of the present invention were designed specifically for use with a wavefront emanating from a very bright source having fine surface detail, such as the granulation pattern of the sun, and is particularly suitable for a real time solar image compensation system. The complexity of the system has been minimized by taking advantage of the following characteristics of this operational environment. The image structure is normally well defined and reasonably constant, and accordingly adaptive features such as variable shear are not required. There is no induced wind velocity caused by image motion, which allows the measurement time to be several milliseconds.

Accordingly, it is an object of the subject invention to provide an improved incremental wavefront detector in which a single reticle is oscillated along a single axis. The arrangement is relatively simple and rugged, and functions with a high optical efficiency over a wide spectral range while requiring minimal electronic circuitry.

In accordance with the teachings of the present invention, a relatively simple wavefront sensor is constructed with an optical system which focuses an incident wavefront to a focal point. A novel modulation reticle is positioned at the focal point, and is driven in linear oscillation along a single axis. The modulation reticle has a modulation pattern formed thereon in which light transmissive areas and light opaque areas or light reflective areas are separated by oblique, relative to the single axis, lines of demarcation such that the precise time of modulation of light at the focal point is dependent upon both its x and y position with respect to the reticle. In a preferred embodiment, the reticle modulation pattern is formed by a sequence of alternating triangular light transmissive areas and triangular light reflective areas, with the triangles of the light reflective areas being inverted with respect to the triangles of the light transmissive areas, such that the oblique lines of demarcation therebetween alternate in first and second directions.

In this preferred embodiment, a first detector is positioned to detect the wavefront which has passed through the transmissive areas after it has diverged from the focal point. The first detector detects the expanded transmitted wavefront at a two dimensional array of zones, and produces an output signal indicative of the light detected in each zone. A second detector is positioned to detect the wavefront which has been reflected by the reflective areas after it has diverged from the focal point. The second detector detects the expanded reflected wavefront at a two dimensional array of zones, and produces an output signal indicative of the light detected in each zone. The output signals from the first and second detectors for each corresponding zone in the two dimensional array of zones are then differentially combined in an amplifier to form a differential output signal for each zone.

The preferred embodiment described above has an extremely high optical efficiency as it detects substantially 100% of the light in the incident wavefront. However, alternative embodiments of the present invention are also possible in which only the transmitted radiation or only the reflected radiation is detected in a less efficient but simpler arrangement.

In the preferred embodiments herein the detectors are two-dimensional photodetector arrays, but alternative types of detectors, such as for example a vidicon tube, are also encompassed within the teachings of the present invention. The drive for the reticle in the preferred embodiment is an electrically driven tuning fork, but other types of actuators, such as for example an electromechanical torsional vibrator or piezoelectric bimorph could also be utilized.

The y position of detected radiation in the wavefront is obtained in the preferred embodiment by multiplying the differential output signal for each zone by a weighting function proportional to the instantaneous velocity of the reticle and then smoothing the signal with a low pass filter. Similarly, the x position is obtained by multiplying the differential output signal for each zone by a weighting function proportional to the instantaneous velocity of the reticle and by a square wave function having a positive value when the displacement of the reticle along the single axis is positive, with respect to a coordinate system defined by the mean position of the center of the modulation pattern (by the X=O axis in FIG. 3), and having a negative value when the displacement of the reticle along the axis is negative with respect to the coordinate system, and then smoothing the signal with a low pass filter.

BRIEF DESCRIPTION OF THE DRAWINGS

The foregoing objects and advantages of the present invention for a wavefront sensor may be more readily understood by one skilled in the art with reference being had to the following detailed description of several preferred embodiments thereof, taken in conjunction with the accompanying drawings wherein.

DETAILED DESCRIPTION OF THE DRAWINGS

Figure 1:
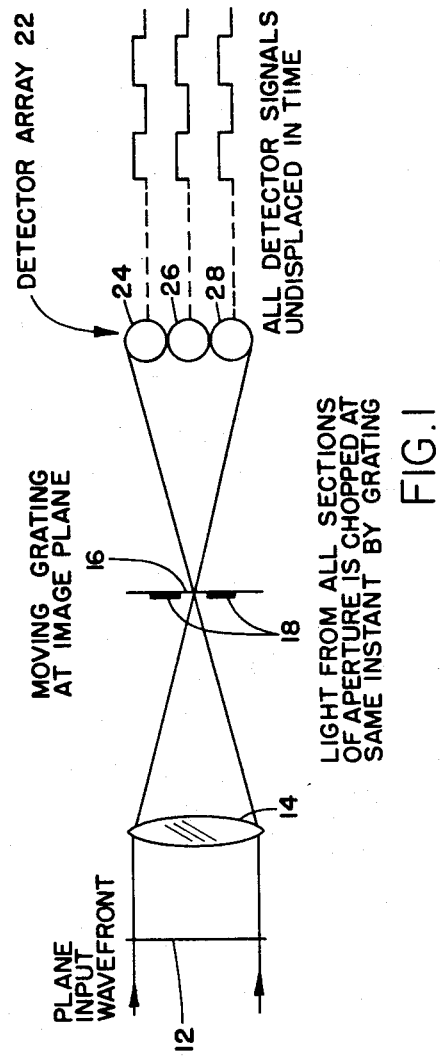
FIGS. 1 and 2 are relatively simple optical diagrams illustrating the principles of operation of the present invention.
Figure 2:
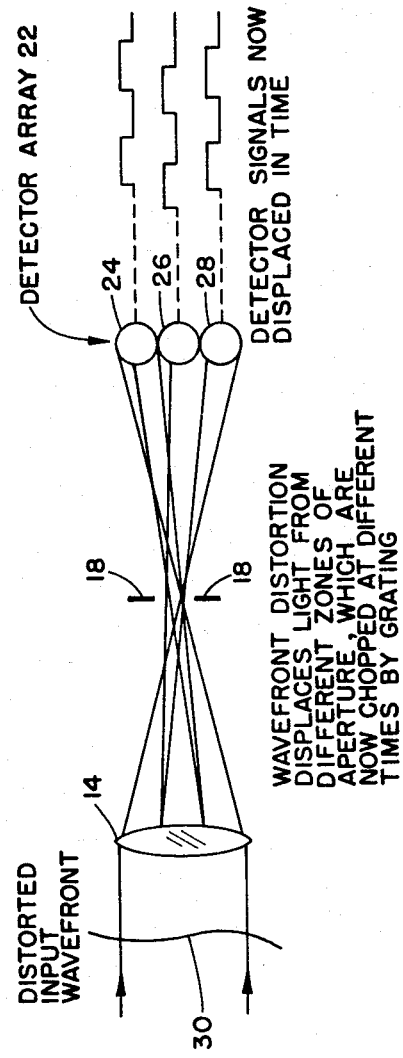

Referring to the drawings in detail, FIGS. 1 and 2 illustrate the general principles of operation of the wavefront sensor of the present invention. FIG. 1 shows a plane, undeformed wavefront 12 which is incident upon a spherical objective lens 14 which focuses the wavefront at its focal plane 16. A linearly oscillating grating 18 is positioned in the focal plane 16, and for purposes of this explanation can be thought of as simply two or more cycles of a square wave function having adjacent transmissive and opaque grating lines. Since the incident wavefront is plane and undeformed, all portions thereof are focused to a single focal point at the moving grating at the same time, and the wavefront is uniformly modulated or chopped thereby. The wavefront then expands until it is incident upon a detector array 22, shown schematically as having three photodetectors 24, 26 and 28. Each detector in the array produces a square wave output in coincidence with the modulation by the moving grating, and the output signals of all of the detectors 24, 26 and 28 are undisplaced in time with respect to each other.

FIG. 2 illustrates the response of the same wavefront sensor to a distorted input wavefront 30. The wavefront distortion causes a displacement in space of each portion of the wavefront focused by spherical objective 14 onto the moving grating 18. This displacement is spaced causes different portions of the wavefront to be modulated or chopped at different times by the moving grating 18. The detectors 24, 26 and 28 are each responsive to a different portion of the incident wavefront, with photodetector 24 sensing primarily the bottom third of the incident wavefront, detector 26 responding primarily to the middle third of the incident wavefront, and photodetector 28 sensing primarily the upper third of the incident wavefront, as shown. The photodetectors now produce output signals which are displaced in time and phase relative to each other, with the displacement being proportional to the distortion or wavefront slope of the input wavefront.

Figure 3:
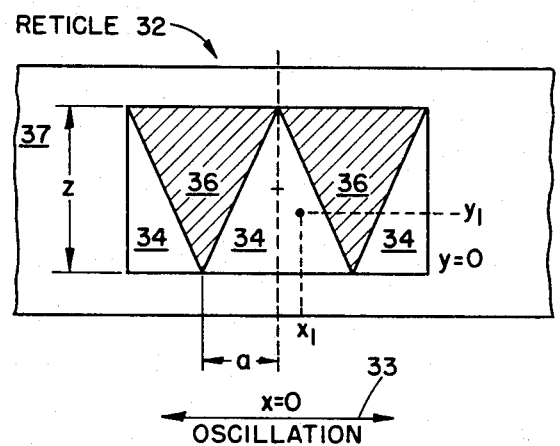
FIG. 3 illustrates a novel modulation reticle constructed pursuant to the subject invention, and also shows a coordinate system defined thereby.
Figure 4:
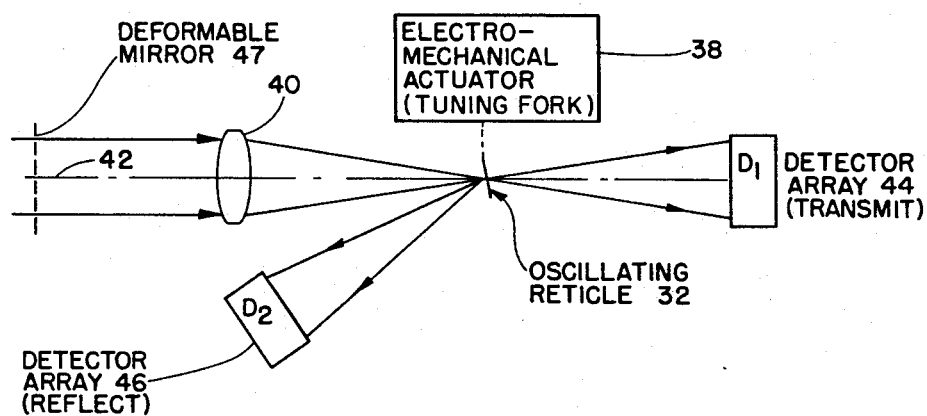
FIG. 4 is an optical diagram of a preferred embodiment of a wavefront sensor constructed pursuant to the teachings herein.

FIG. 3 illustrates a novel reticle 32 pursuant to the teachings of the present invention which can be employed in an optical system of the type shown in FIG. 4. The reticle 32 operates by oscillation along a single axis 33, and this results in light incident on the reticle being modulated or chopped by triangular or diamond shaped areas 34 which transmit light arranged in an alternating series with triangular or diamond shaped areas 36 which reflect light.

The reticle 32 can be formed either on a substrate of material 37 which transmits the wavelength of radiation being measured, in which case the complementary reflecting areas 36 can be deposited thereon, or it can be made from an opaque material with clear apertures 34 cut out of the substrate. In the latter case, the radiation being measured is either passed or reflected by the reticle so that the device can be used at very short (UV) and very long (IR) wavelengths as well as at visible wavelengths. The areas of the transmitting and reflecting parts of the reticle are fixed and invariate during each oscillation period, as a result of which the wavefront sensor will operate with extended reference surfaces such as the surface of the sun. A major requirement is that the scale of the brightness variations in the reference source image (such as solar granulation) be comparable with the size of the transmitting or reflecting areas in the reticle.

The reticle 32 is oscillated by an electromechanical actuator 38 in a linear fashion along the single axis 33 substantially parallel to the bases of the triangles with a peak to peak amplitude which is at least as large as the width of the bases. The electrically driven actuator 38 can, for instance, be a commercially available tuning fork or torsional vibrator. The reticle 32 can be optically formed on an extremely light film substrate such that it can be mounted on an electrically driven tuning fork, such as are commercially available from American Time Products, to linearly oscillate therewith. Tests on this arrangement have indicated that the addition of a film substrate to the vibrating element of the tuning fork has little apparent effect on its operation. Oscillation frequencies of up to three kilohertz are possible using commercially available tuning forks.

FIG. 4 is an optical schematic of one embodiment of a wavefront sensor utilizing the reticle 32 of FIG. 3 in which a spherical objective lens 40 focuses the incident wavefront from a reference source to a focal plane at which reticle 32 is obliquely positioned relative to the optical axis 42 of lens 40. Light passing through the transmitting areas 34 of reticle 32 is incident upon a first detector array 44, while light reflected by the reflecting areas 36 is incident upon a second detector array 46. If the wavefront sensor of the present invention is utilized in a wavefront correction system having a deformable mirror 47, the detector arrays 44 & 46 are positioned at aperture planes conjugate to the deformable mirror. Each of the detector arrays 44 & 46 can be a silicon detector array incorporating preamplifiers therein, as are commercially available from Silicon Detector Corporation, which are considered to be suitable for the practice of the present invention. Alternatively, other types of two dimensional photodetectors, such as vidicon tubes, could be utilized in alternative embodiments.

The operation of the wavefront sensor can be explained by making the simplifying assumption that the image of the reference source is much smaller than the size of the reticle, so that the image is modulated or chopped at several points in each cycle of oscillation, with the precise time of chopping being dependent on the position of the point of light with respect to fixed coordinates. The position of the point of light is specified by coordinates $x_1$ and $y_1$ as illustrated in FIG. 3. The wavefront sensor functions by independently measuring the coordinates $x_1$ and $y_1$, which are in turn proportional to the wavefront tilt within the aperture(s) being measured.

Figure 5:
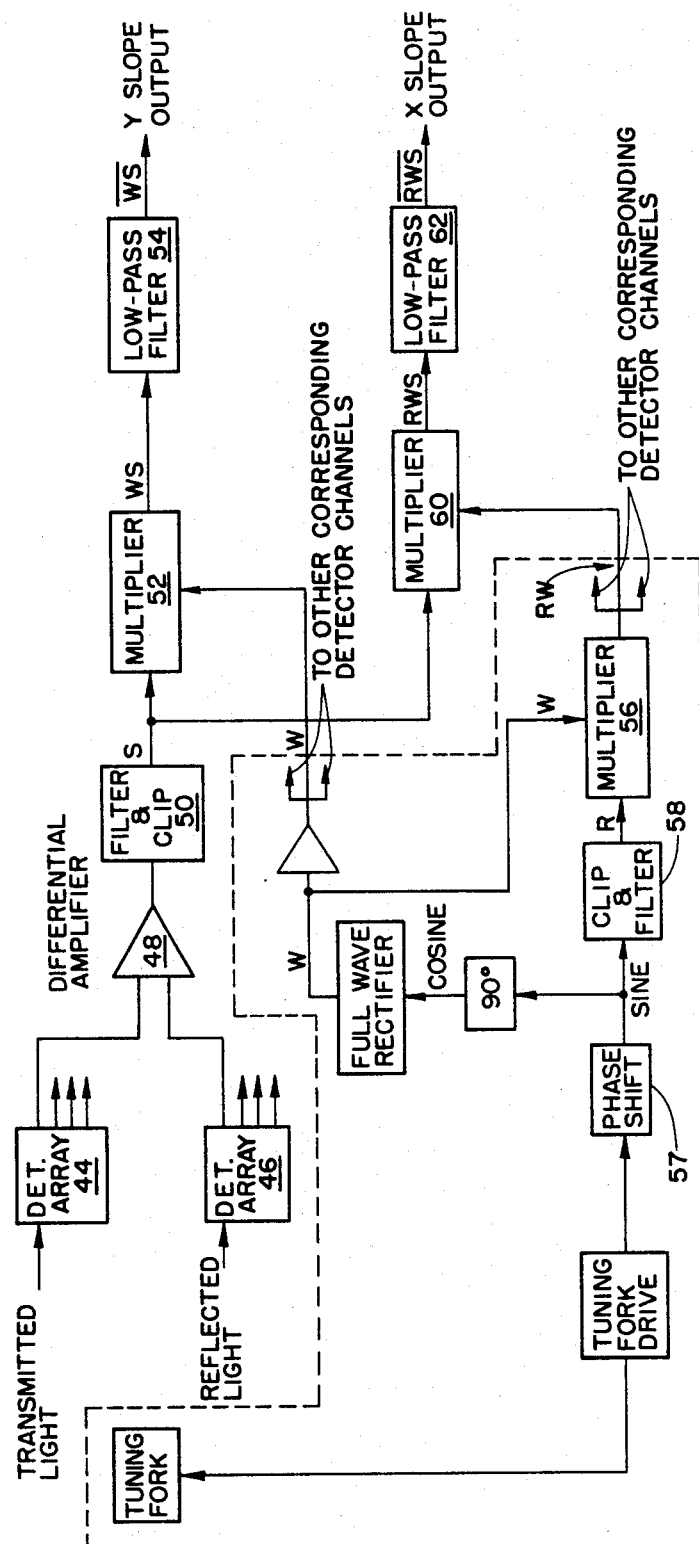
FIG. 5 is a block diagram of a circuit for processing the output signals of the wavefront sensor, and illustrates in detail one of the multiple processing channels required thereby.
Figure 6:
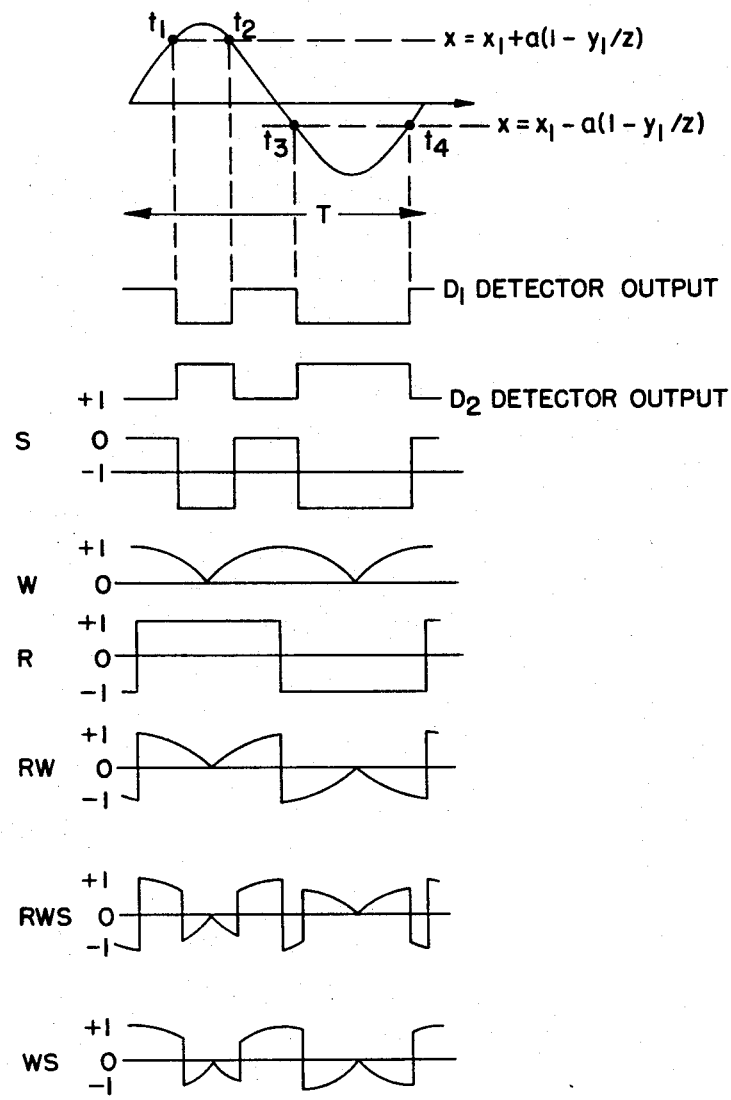
FIG. 6 is a set of waveforms useful in explaining the operation of the circuit of FIG. 5.

FIG. 5 illustrates a block diagram of the wavefront sensor electronics in one embodiment thereof. The detailed processing channel of only one pair of corresponding detectors (corresponding in x & y coordinates within the two detector arrays such that each of the two detectors is examining the same portion of the wavefront) is illustrated in FIG. 6 for the sake of simplicity. Components enclosed in dotted lines are common to all detector channels. In practice, every other pair of corresponding detectors would be processed in a similar manner as indicated generally in FIG. 5. Similar in concept to the embodiment of FIGS. 1 and 2, the detectors in the array are responsive to different portions of the wavefront, and produce output signals which are displaced in phase in proportion to the wavefront tilt.

The transmitted and reflected detector signals from corresponding detectors in the two arrays are added antiphase in a differential amplifier 48 to derive a composite signal. The composite signal is then filtered and clipped by circuit 50 to obtain a further composite signal S which is then multiplied in circuit 52 by a weighting function W which is proportional to the instantaneous velocity of the reticle. Sample waveforms of the signals referred to herein are illustrated in FIG. 6. For simple harmonic vibrations of the reticle (where the displacement is sinusoidal), the weighting function W is a cosine. The resulting signal WS is averaged by passage through a low pass filter 54 to produce an analog voltage $\overline{WS}$ proportional to the y coordinate of the reference source image. The analysis below shows that this output signal $\overline{WS}$ is independent of the x coordinate of the reference source image.

The x coordinate of the source is obtained by multiplying in circuit 56 of the cosine weighting function W by a reference function R, which is a square wave having a value $+1$ when the x displacement of the reticle is positive and $-1$ when the x displacement of the reticle is negative. In those embodiments wherein an electrically driven tuning fork is the electromechanical drive for the reticle 32, this function may be derived from the tuning fork drive sinusoid by first passing the drive signal through a phase shift circuit 57 to adjust the phase of the signal relative to the reticle position. The resultant signal is then amplified and clipped in circuit 58 to obtain a reference function R which is multipled by the weighting function W in circuit 56 to obtain a further reference function RW. The reference function RW is then multiplied by the composite signal S in a further multiplier circuit 60 to produce a resulting signal RWS. The resulting signal RWS is then averaged by passage through a second low pass filter 62 to produce an analog voltage $\overline{RWS}$ which is proportional to the x coordinate of the reference source image. This output is independent of the y coordinate of the reference source image, as also shown by the analysis below.

Referring now to FIG. 3, if the location of the image of the reference source is $X_1Y_1$, then the edge of the reticle will cross this image at displacements of $$x = x_1 \pm a\left(1 - \frac{y_1}{z}\right) \tag{3-1}$$

The reticle displacement as a function of time is:

$$x = a \sin \frac{2\pi t}{T} \tag{3-2}$$

Where T = the period of oscillation of reticle.

The time at which the edges are crossed are then defined by the relation:

$$a \sin \frac{2\pi t}{T} = x_1 \pm a\left(1 - \frac{y_1}{z}\right) \tag{3-3}$$

or

-continued $$t = \frac{T}{2\pi} \sin^{-1}\left[\frac{x_1}{a} \pm \left(1 - \frac{y_1}{z}\right)\right] \quad (3\text{-}3a)$$

In each cycle of oscillation, there are normally four crossing times $t_1$, $t_2$, $t_3$, and $t_4$, as shown in FIG. 6, which also depicts the transmitted and reflected detector signals. It is evident that the crossing times that determine the shape of the detector output signals are a function of both the x and y coordinates of the reference image. These coordinates may be separated using the approach now described.

The detector output signals are multiplied by a weighting function W(t), the magnitude of which is proportional to the instantaneous velocity of the reticle:

$$W(t) = \left|\frac{dx}{dt}\right| = \left|\frac{2\pi a}{T} \cos \frac{2\pi t}{T}\right| \quad (3\text{-}4)$$

The average signal over one cycle is then:

$$\overline{WS} = 2\int_0^{t_1} W(t)dt - 2\int_{t_1}^{T/4} W(t)dt + \quad (3\text{-}5)$$
$$2\int_{T/2}^{t_3} W(t)dt - 2\int_{t_3}^{3T/4} W(t)dt$$

By definition:

$$\int W(t)dt = \left|a \sin \frac{2\pi t}{T}\right|$$

So that using Eq. 3—3, the following is derived:

$$\overline{WS} = 2a\left[\frac{x_1}{a} + \left(1 - \frac{y_1}{z}\right)\right] - 2a\left\{1 - \left[\frac{x_1}{a} + \left(1 - \frac{y_1}{z}\right)\right]\right\} \quad (3\text{-}6)$$
$$- 2a\left[\frac{x_1}{a} - \left(1 - \frac{y_1}{z}\right)\right] + 2a\left\{-1 - \left[\frac{x_1}{a} - \left(1 - \frac{y_1}{z}\right)\right]\right\}$$

$$\overline{WS} = 4a\left(1 - \frac{2y_1}{z}\right) \quad (3\text{-}7)$$

The value of $\overline{WS}$ is therefore proportional to $y_1$ and independent of $x_1$.

If the polarity of the third and fourth terms in Eq. 3-6 is reversed by multiplying WS by R, then:

$$\overline{RWS} = 2a\left(4\frac{x_1}{a}\right) = 8x_1 \quad (3\text{-}8)$$

The value of $\overline{RWS}$ is therefore proportional to $x_1$ and independent of $y_1$.

Operation of the wavefront sensor with an extended reference source rather than a source smaller than the reticle is explained as follows:

When the wavefront is produced by a uniformly illuminated source, there is no intensity modulation of the light at the detector plane. However if the intensity of the reference source image is not uniform, for example due to surface granulation of the sun in a solar observation optical system, then the light reaching each detector is modulated in intensity as a function of time at the frequency of the reticle oscillation. For a plane wavefront, the intensity modulation is substantially the same, as a function of time, at all of the detector zones. However if the wavefront is deformed, the image produced at the reticle in each detector zone is displaced by the local wavefront slope so that the intensity variations in each detector zone are displaced in time.

A simplified version of the wavefront sensor of the present invention was built and tested in which the reticle was formed on 5 mil Estar based film and consisted of a clear equilateral triangle with base and height equal to 0.006 inches, with an opaque background. The film chip measured 0.10×0.15 inches, and was cemented to one blade of a 1,700 Hz tuning fork, commercially available from American Time Products. The addition of the film chip made no apparent difference to the operation of the tuning fork. The objective lens 40 was 2 inches in diameter, with a focal length of 15 inches. Only the transmitted light was used in this simplified embodiment.

A detector array consisting of four type SK-100-42-12-231 silicon detector/preamps, commercially available from Silicon Detector Corp., was employed. This array was located in the diverging beam, 12 inches from the grating. Illumination was provided by a HeNe laser with a 2 inch diameter collimator. The electronics was generally the same as that shown in FIG. 5, with a total of four phase detectors, one for each silicon detector. A fixed voltage was applied to the four differential preamplifiers in place of the reflected light detectors. The four x slope outputs and the four y slope outputs were each summed to provide overall x tilt and y tilt outputs. The test program was limited to measuring the x and y displacement sensitivities, performed by deflecting the laser beam by a known amount, and then measuring the x and y tilt outputs.

In the results of these initial tests, the oscillation amplitude of the reticle was 0.006 inches (150 μm) peak to peak, equal to the base of the triangle. The sensor operated perfectly with sine wave tilt inputs at frequencies up to 250 Hz, at which the mechanism for deflecting the laser beam resonated. Noise in the wavefront sensor output was encountered primarily at the 1,700 Hz chopping frequency and its harmonics. The maximum frequency response of the reticle sensor appeared to be limited only by the allowable noise at the chopping frequency passed by the output low pass filter. The test results indicated that the reticle wavefront sensor had an unambiguous measurement range in x and y approximately equal to the size of the reticle, as expected. The zero or null point was stable and well defined, which is important for closed loop operation. Some nonlinearity in the output voltage was apparent, especially in the y axis, but the results of the initial tests were positive.

The signals generated by the circuit in FIG. 5 can then be utilized in a real time wavefront correction system in a manner similar to that disclosed and taught in Hardy U.S. Pat. No. 3,923,400, which is expressly incorporated by reference herein.

While several embodiments and variations of the present invention for a wavefront sensor have been described in detail, it should be appreciated that the disclosure and teachings of the present invention as set forth herein will suggest yet other variations and embodiments to those skilled in the art.

What is claimed is:

1. A relatively simple two-dimensional wavefront sensor, comprising:
   a. an optical system for focusing an incident wavefront to a focal point;
   b. a modulation reticle positioned substantially at said focal point, and a drive means for driving the modulation reticle in linear oscillation along a single axis, said modulation reticle having a modulation pattern thereon in which at least one light transmissive area and at least one light opaque area thereon is separated by at least two oblique, relative to said single axis, lines of demarcation such that the precise time of modulation of light at the focal point is dependent upon both the x and y position of the light with respect to the oblique line of demarcation; and
   c. a first detector means for detecting the wavefront, which has passed through said transmissive area and expanded from said focal point, at a two dimensional array of zones in the expanded wavefront and for producing an output signal indicative of the light detected in each zone.

2. A relatively simple two-dimensional wavefront sensor, as claimed in claim 1, in which said opaque area is a reflective area, and further including a second detector means for detecting the wavefront, which has been reflected by said reflective area and expanded from said focal point, at a two dimensional array of zones in the expanded wavefront and for producing an output signal indicative of the light detected in each zone.

3. A relatively simple two-dimensional wavefront sensor, as claimed in claim 2, further including a circuit for differentially combining the output signals from said first and second detector means for each corresponding zone in the two dimensional array of zones to form a differential output signal for each zone.

4. A relatively simple two-dimensional wavefront sensor, as claimed in claim 1 or 2 or 3, wherein each detector means includes a two-dimensional photodetector array.

5. A relatively simple two-dimensional wavefront sensor, as claimed in claim 1 or 2 or 3, said drive means including an electrically actuated tuning fork.

6. A relatively simple two-dimensional wavefront sensor, as claimed in claim 1 or 2 or 3, said modulation reticle having a modulation pattern thereon formed by a sequence of alternating triangular light transmissive areas and triangular light opaque areas with the triangles of the light opaque areas being inverted with respect to the triangles of the light transmissive areas such that the oblique lines of demarcation therebetween alternate in first and second directions.

7. A relatively simple two-dimensional wavefront sensor, as claimed in claim 1, including circuit means for multiplying the output signal for each zone, from said first detector means, by a weighting function W proportional to the instantaneous velocity of the reticle.

8. A relatively simple two-dimensional wavefront sensor, as claimed in claim 1 or 7, including circuit means for muliplying the output signal for each zone, from said first detector means by a square wave function having a positive value when the displacement of the reticle along said single axis is positive with respect to a coordinate system defined by said modulation pattern and having a negative value when the displacement of the reticle along said single axis is negative with respect to said coordinate system.

9. A relatively simple two-dimensional wavefront sensor, as claimed in claim 3, including circuit means for multiplying the differential output signal for each zone by a weighting function W proportional to the instantaneous velocity of the reticle.

10. A relatively simple two-dimensional wavefront sensor, as claimed in claim 3 or 9, including circuit means for multiplying the differential output signal for each zone by a square wave function having a positive value when the displacement of the reticle along said single axis is positive with respect to a coordinate system defined by said modulation pattern and having a negative value when the displacement of the reticle along said single axis is negative with respect to said coordinate system.

11. A relatively simple two-dimensional wavefront sensor, comprising:
   a. An optical system for focusing an incident wavefront to a focal point;
   b. a modulation reticle positioned substantially at said focal point, and a drive means for driving the modulation reticle in linear oscillation along a single axis, said modulation reticle having a modulation pattern thereon in which at least one light reflective area and at least one light opaque area thereon is separated by an oblique, relative to said single axis, line of demarcation such that the precise time of modulation of light at the focal point is dependent upon both the x and y position of the light with respect to the oblique line of demarcation; and
   c. a first detector means for detecting the wavefront, which has been reflected by said reflective area and expanded from said focal point, at a two dimensional array of zones in the expanded wavefront and for producing an output signal indicative of the light detected in each zone.

* * * * *